United States Patent
Ejsing et al.

(10) Patent No.: US 12,399,877 B2
(45) Date of Patent: *Aug. 26, 2025

(54) SYSTEMS AND METHODS FOR CHRONOLOGICALLY AGNOSTIC INTEGRATION AND VISUALIZATION OF TEMPORAL DATABASE CHANGES

(71) Applicant: Certinia Inc., San Jose, CA (US)

(72) Inventors: Simon Ejsing, Redmond, WA (US); Andrew Chico, Bellevue, WA (US)

(73) Assignee: Certinia Inc., Austin, TX (US)

( * ) Notice: Subject to any disclaimer, the term of this patent is extended or adjusted under 35 U.S.C. 154(b) by 190 days.

This patent is subject to a terminal disclaimer.

(21) Appl. No.: 17/953,226

(22) Filed: Sep. 26, 2022

(65) Prior Publication Data

US 2023/0205745 A1    Jun. 29, 2023

Related U.S. Application Data

(63) Continuation of application No. 16/532,669, filed on Aug. 6, 2019, now Pat. No. 11,455,286.

(51) Int. Cl.
*G06F 7/00* (2006.01)
*G06F 16/21* (2019.01)
*G06F 16/2458* (2019.01)
*G06F 17/00* (2019.01)

(52) U.S. Cl.
CPC .......... *G06F 16/219* (2019.01); *G06F 16/213* (2019.01); *G06F 16/2477* (2019.01)

(58) Field of Classification Search
CPC ... G06F 16/219; G06F 16/2477; G06F 16/213

USPC .................................................. 707/610–704
See application file for complete search history.

(56) References Cited

U.S. PATENT DOCUMENTS

| | | | |
|---|---|---|---|
| 5,673,390 | A | 9/1997 | Mueller |
| 5,787,432 | A | 7/1998 | Letourneau |
| 6,425,017 | B1 | 7/2002 | Dievendorff et al. |
| 6,449,643 | B1 | 9/2002 | Hyndman et al. |
| 6,839,356 | B2 | 1/2005 | Barany et al. |
| 7,325,109 | B1 | 1/2008 | Muppalaneni et al. |

(Continued)

FOREIGN PATENT DOCUMENTS

WO    2013179383 A1    12/2013

OTHER PUBLICATIONS

Abstract vs. Concrete Syntax Trees by Eli Bendersky, published Feb. 16, 2009, https://elithegreenplace.net/2009/02/16/abstract-vs-concrete-syntax-trees (Year: 2009).

(Continued)

*Primary Examiner* — Tuan A Pham
(74) *Attorney, Agent, or Firm* — Carr & Ferrell LLP (57) ABSTRACT

Disclosed herein is a data structure that reduces computational load on a database in querying and visualizing historical values of slowly changing dimensions. The slowly changing dimensions have one or more values associated with them (e.g., a monthly average accounts receivable is a single value, and a set of contact information for an individual may have multiple values). On a periodic basis, database images, also known as "snapshots" are generated of a current status of a given database. The snapshots are used to build a historical data table that is computationally efficient to reference.

20 Claims, 7 Drawing Sheets

(56) References Cited

U.S. PATENT DOCUMENTS

| | | | |
|---|---|---|---|
| 7,809,376 B2 | 10/2010 | Letourneau et al. | |
| 8,032,860 B2 | 10/2011 | Piehler et al. | |
| 8,122,367 B2 | 2/2012 | Krieger et al. | |
| 8,156,083 B2 | 4/2012 | Banerjee et al. | |
| 8,195,770 B1 | 6/2012 | Aral et al. | |
| 8,359,015 B2 | 1/2013 | Swaminathan et al. | |
| 8,438,654 B1 | 5/2013 | Eicken et al. | |
| 8,543,118 B1 | 9/2013 | Mangal et al. | |
| 8,892,446 B2 | 11/2014 | Cheyer et al. | |
| 8,964,298 B2 | 2/2015 | Haddick et al. | |
| 9,185,719 B2 | 11/2015 | Wietfeldt et al. | |
| 9,189,753 B2 | 11/2015 | Morley et al. | |
| 9,501,585 B1 | 11/2016 | Gautam et al. | |
| 9,817,439 B2 | 11/2017 | Gosieski, Jr. et al. | |
| 9,900,302 B2 | 2/2018 | Wood | |
| 9,940,190 B2* | 4/2018 | Hooks | G06F 11/1451 |
| 10,073,824 B1 | 9/2018 | Krappe | |
| 10,110,716 B2 | 10/2018 | Lim et al. | |
| 10,152,499 B1 | 12/2018 | Wilton | |
| 10,303,675 B2 | 5/2019 | Fawcett et al. | |
| 10,348,716 B2 | 7/2019 | Wood | |
| 10,423,396 B1 | 9/2019 | Yang | |
| 10,496,741 B2 | 12/2019 | Willcock et al. | |
| 10,558,757 B2 | 2/2020 | Fan et al. | |
| 10,671,428 B2 | 6/2020 | Zeitlin | |
| 10,776,355 B1 | 9/2020 | Batsakis et al. | |
| 10,846,471 B2 | 11/2020 | Brown et al. | |
| 10,846,481 B2 | 11/2020 | Willcock et al. | |
| 10,853,455 B2 | 12/2020 | Foster et al. | |
| 10,922,485 B2 | 2/2021 | Corfield et al. | |
| 11,038,689 B2 | 6/2021 | Bres | |
| 11,210,460 B2 | 12/2021 | Willcock et al. | |
| 11,238,218 B2 | 2/2022 | Corfield et al. | |
| 11,265,304 B2 | 3/2022 | Wood | |
| 11,347,938 B2 | 5/2022 | Brown et al. | |
| 11,373,046 B2 | 6/2022 | Willcock et al. | |
| 11,455,286 B2* | 9/2022 | Ejsing | G06F 16/219 |
| 2003/0033278 A1 | 2/2003 | Abe et al. | |
| 2004/0102956 A1 | 5/2004 | Levin | |
| 2004/0205726 A1 | 10/2004 | Chedgey et al. | |
| 2004/0243794 A1 | 12/2004 | Mackin et al. | |
| 2004/0255233 A1 | 12/2004 | Croney et al. | |
| 2005/0094206 A1 | 5/2005 | Tonisson | |
| 2005/0246632 A1 | 11/2005 | Guido et al. | |
| 2006/0190452 A1 | 8/2006 | Ellis et al. | |
| 2006/0190487 A1 | 8/2006 | Hicks et al. | |
| 2007/0089053 A1 | 4/2007 | Uhlig et al. | |
| 2008/0147627 A1 | 6/2008 | Natkovich et al. | |
| 2008/0282175 A1 | 11/2008 | Costin et al. | |
| 2008/0306981 A1 | 12/2008 | Jiang et al. | |
| 2009/0006146 A1* | 1/2009 | Chowdhary | G06Q 10/10 |
| | | | 705/7.11 |
| 2009/0037933 A1 | 2/2009 | Chandran et al. | |
| 2009/0125888 A1 | 5/2009 | Ahe et al. | |
| 2009/0204386 A1 | 8/2009 | Seligman et al. | |
| 2009/0248393 A1 | 10/2009 | Tomko et al. | |
| 2009/0265531 A1 | 10/2009 | Hu et al. | |
| 2009/0281789 A1 | 11/2009 | Waibel et al. | |
| 2009/0319499 A1 | 12/2009 | Meijer et al. | |
| 2011/0016180 A1 | 1/2011 | Bharadhwaj et al. | |
| 2011/0078297 A1 | 3/2011 | Tamura | |
| 2011/0197124 A1 | 8/2011 | Garaventa | |
| 2011/0213766 A1 | 9/2011 | Hong et al. | |
| 2011/0265066 A1 | 10/2011 | Fee et al. | |
| 2011/0276945 A1 | 11/2011 | Chasman et al. | |
| 2011/0307948 A1 | 12/2011 | Ranjan et al. | |
| 2012/0084609 A1 | 4/2012 | Tkachuk et al. | |
| 2012/0131445 A1 | 5/2012 | Oyarzabal et al. | |
| 2012/0198279 A1 | 8/2012 | Schroeder | |
| 2012/0271857 A1 | 10/2012 | Chasman et al. | |
| 2012/0304051 A1 | 11/2012 | Balakrishnan et al. | |
| 2013/0042115 A1 | 2/2013 | Sweet et al. | |
| 2013/0139162 A1 | 5/2013 | Jackson | |
| 2013/0145259 A1 | 6/2013 | Kiefer, III et al. | |
| 2013/0159840 A1 | 6/2013 | Nicolaescu | |
| 2013/0226562 A1 | 8/2013 | Arnon | |
| 2014/0053160 A1 | 2/2014 | Fee et al. | |
| 2014/0068040 A1* | 3/2014 | Neti | G06F 9/485 |
| | | | 709/223 |
| 2014/0279977 A1 | 9/2014 | Milousheff et al. | |
| 2014/0282968 A1 | 9/2014 | Aboughanaima et al. | |
| 2014/0344435 A1 | 11/2014 | Mortimore, Jr. et al. | |
| 2015/0026075 A1 | 1/2015 | Mondri et al. | |
| 2015/0142846 A1 | 5/2015 | Levine et al. | |
| 2015/0143485 A1 | 5/2015 | Tamura | |
| 2015/0149884 A1 | 5/2015 | Wagner et al. | |
| 2015/0149893 A1 | 5/2015 | Lukic et al. | |
| 2015/0186929 A1 | 7/2015 | Thies et al. | |
| 2015/0293764 A1 | 10/2015 | Visvanathan | |
| 2015/0331701 A1 | 11/2015 | Man et al. | |
| 2016/0069703 A1 | 3/2016 | Nakano et al. | |
| 2016/0173411 A1 | 6/2016 | Son et al. | |
| 2016/0239509 A1 | 8/2016 | Ahuja et al. | |
| 2016/0294667 A1 | 10/2016 | Prabhakar et al. | |
| 2016/0299982 A1 | 10/2016 | Bhave et al. | |
| 2016/0301732 A1 | 10/2016 | Moretto et al. | |
| 2016/0350084 A1 | 12/2016 | Waggoner et al. | |
| 2016/0378450 A1 | 12/2016 | Fu et al. | |
| 2017/0139806 A1* | 5/2017 | Xu | G06F 11/3612 |
| 2017/0147404 A1* | 5/2017 | Chen | G06F 9/5038 |
| 2017/0264619 A1 | 9/2017 | Narayanaswamy et al. | |
| 2017/0272550 A1 | 9/2017 | Rodriguez | |
| 2017/0337233 A1 | 11/2017 | Fawcett et al. | |
| 2017/0372246 A1 | 12/2017 | Storey | |
| 2017/0374050 A1 | 12/2017 | Wood | |
| 2018/0081868 A1 | 3/2018 | Willcock et al. | |
| 2018/0102013 A1 | 4/2018 | Spanos et al. | |
| 2018/0139197 A1 | 5/2018 | Woods | |
| 2018/0157479 A1 | 6/2018 | Zhou et al. | |
| 2018/0211213 A1 | 7/2018 | Mvier | |
| 2018/0321918 A1 | 11/2018 | McClory et al. | |
| 2019/0079959 A1* | 3/2019 | Ramaiyer | G06F 16/2246 |
| 2019/0179729 A1* | 6/2019 | Roskowski | G06F 11/3452 |
| 2019/0182029 A1 | 6/2019 | Yim et al. | |
| 2019/0272266 A1 | 9/2019 | Fawcett et al. | |
| 2019/0273616 A1 | 9/2019 | Bres | |
| 2019/0288994 A1 | 9/2019 | Wood | |
| 2020/0004824 A1 | 1/2020 | Willcock et al. | |
| 2020/0012717 A1 | 1/2020 | Brown et al. | |
| 2020/0067697 A1 | 2/2020 | Puddu et al. | |
| 2020/0089760 A1 | 3/2020 | Ericson et al. | |
| 2020/0097389 A1 | 3/2020 | Smith et al. | |
| 2020/0097537 A1 | 3/2020 | Willcock et al. | |
| 2020/0218634 A1 | 7/2020 | Jones et al. | |
| 2021/0011972 A1 | 1/2021 | Corfield et al. | |
| 2021/0042279 A1 | 2/2021 | Ejsing et al. | |
| 2021/0089714 A1 | 3/2021 | Brown et al. | |
| 2021/0141495 A1 | 5/2021 | Willcock et al. | |
| 2021/0141836 A1 | 5/2021 | Byrne | |
| 2021/0200946 A1 | 7/2021 | Corfield et al. | |
| 2021/0224713 A1 | 7/2021 | Storey | |
| 2021/0326321 A1 | 10/2021 | Fawcett et al. | |
| 2021/0336794 A1 | 10/2021 | Bres | |
| 2022/0164527 A1 | 5/2022 | Willcock et al. | |
| 2024/0179153 A1* | 5/2024 | Yadav | H04L 43/04 |

OTHER PUBLICATIONS

Cortes, Howard, Non-Final Office Action mailed Aug. 3, 2021 for U.S. Appl. No. 17/139,981.

Cortes, Howard, Non-Final Office Action mailed Sep. 18, 2020 for U.S. Appl. No. 16/507,561.

Cortes, Howard, Notice of Allowance and Fee(s) Due mailed Dec. 15, 2020 for U.S. Appl. No. 16/507,561.

Cortes, Howard, Notice of Allowance and Fee(s) Due mailed Sep. 20, 2021 for U.S. Appl. No. 17/139,981.

Example: How to Use Objects in Apex, published Jan. 15, 2015 by SFDC99.com, https://www.sfdc99.com/2015/01/15/example-how-to-use-objects-in-apex/ (Year: 2015).

Force.com Apex Code Developer's Guide, Salesforce, Published Dec. 17, 2015, all pages. (Year: 2015), 2505 pages.

(56) References Cited

OTHER PUBLICATIONS

Hive vs. Hbase, Different Technologies that work Better Together, dezyre webpages, Dec. 7, 2016, https://www.dezyre.com/article/hive-vs-hbase-different-technologies-that-work-better-together/322 (Year: 2016).
Ho, Thomas, Non-Final Office Action mailed Oct. 17, 2018 for U.S. Appl. No. 15/869,451.
Ho, Thomas, Notice of Allowance and Fee(s) Due mailed Mar. 4, 2019 for U.S. Appl. No. 15/869,451.
Ho, Thomas, Notice of Allowance and Fee(s) Due mailed Oct. 18, 2017 for U.S. Appl. No. 15/189,218.
Hoang, Son T., Applicant-Initiated Interview Summary mailed Oct. 10, 2018 for U.S. Appl. No. 15/161,142.
Hoang, Son T., Non-Final Office Action mailed May 23, 2018 for U.S. Appl. No. 15/161,142.
Hoang, Son T., Non-Final Office Action mailed Sep. 30, 2020 for U.S. Appl. No. 16/418,928.
Hoang, Son T., Notice of Allowance and Fee(s) Due mailed Feb. 26, 2021 for U.S. Appl. No. 16/418,928.
Hoang, Son T., Notice of Allowance and Fee(s) Due mailed Feb. 8, 2019 for U.S. Appl. No. 15/161,142.
Hutton, Nan, Final Office Action mailed Dec. 7, 2021 for U.S. Appl. No. 16/532,669.
Hutton, Nan, Non-Final Office Action mailed Jul. 26, 2021 for U.S. Appl. No. 16/532,669.
Hutton, Nan, Notice of Allowance and Fee(s) Due mailed May 18, 2022 for U.S. Appl. No. 16/532,669.
Jacob, Ajith, Non-Final Office Action mailed Feb. 15, 2022 for U.S. Appl. No. 16/681,502.
Jones, William B., Applicant-Initiated Interview Summary mailed Nov. 25, 2020 for U.S. Appl. No. 15/909,101.
Jones, William B., Final Office Action mailed Jul. 30, 2020 for U.S. Appl. No. 15/909,101.
Jones, William B., Non-Final Office Action mailed Dec. 20, 2019 for U.S. Appl. No. 15/909,101.
Jones, William B., Non-Final Office Action mailed Mar. 14, 2020 for U.S. Appl. No. 15/909,101.
Jones, William B., Notice of Allowance and Fee(s) Due mailed Feb. 8, 2021 for U.S. Appl. No. 15/909,101.
Language Server Protocol, Wikipedia, published Nov. 8, 2018, https://en.wikipedia.org/w/index.pho?title=Lanugage_Server_Protocol&oldid=867837725 (Year: 2018).
Magical External Objects: Seamless Integration is Here, Salesforce, video published Nov. 17, 2014, retrieved from URL: https://www.youtube.com/watch?v=GGvCcuTbhZE.
Malinowski et al., "A Conceptual Solution for Representing Time in Data Warehouse Dimensions," Proceedings of the 3rd Asia-Pacific Conference on Conceptual Modeling (APCCM2006), Hobart, Australia, Research and Practice in Information Technology, vol. 53 (Year: 2006).
MapReduce, Wikipedia, Archives.org, Jun. 16, 2016, https://web.archive.org/web/20160616175158/https://en.wikipedia.org/wiki/MapReduce (Year: 2016).
McFadden, Susan Iris, Non-Final Office action mailed Nov. 30, 2021 for U.S. Appl. No. 17/037,641.
McFadden, Susan Iris, Notice of Allowance and Fee(s) Due mailed Jul. 17, 2020 for U.S. Appl. No. 16/256,069.
McFadden, Susan Iris, Notice of Allowance and Fee(s) Due mailed Feb. 25, 2022 for U.S. Appl. No. 17/037,641.
Meky, Moustafa M., Non-Final Office Action mailed Sep. 2, 2021 for U.S. Appl. No. 16/432,086.
Mercado Vargas, Ariel, Non-Final Office Action mailed Aug. 3, 2018 for U.S. Appl. No. 15/271,875.
Mercado Vargas, Ariel, Non-Final Office Action mailed Jul. 6, 2020 for U.S. Appl. No. 16/696,782.
Mercado Vargas, Ariel, Non-Final Office Action mailed Jun. 2, 2021 for U.S. Appl. No. 16/696,782.
Mercado Vargas, Ariel, Notice of Allowance and Fee(s) Due mailed Aug. 21, 2019 for U.S. Appl. No. 15/271,875.
MultiThreading with the Actor Model by CoastRD.com, historical version published Apr. 13, 2014, https://web.archive.org/web/20140413175210/http://www.coastrd.com/multithreading-with-the-actor-model (Year: 2014).
Nguyen et al., "An approach towards an event-fed solution for slowly changing dimensions in data warehouses with a detailed case study," Data & Knowledge Engineering 63, pp. 26-43 (Year: 2007).
Rotaru, Octavian, Final Office Action mailed Apr. 6, 2020 for U.S. Appl. No. 15/190,178.
Rotaru, Octavian, Final Office Action mailed Jul. 8, 2019 for U.S. Appl. No. 15/190,178.
Rotaru, Octavian, Final Office Action mailed May 11, 2022 for U.S. Appl. No. 17/163,283.
Rotaru, Octavian, Non-Final Office Action mailed Dec. 9, 2021 for U.S. Appl. No. 17/163,283.
Rotaru, Octavian, Non-Final Office Action mailed Mar. 8, 2019 for U.S. Appl. No. 15/190,178.
Tzeng, Feng-Tzer, Non-Final Office Action mailed Oct. 1, 2021 for U.S. Appl. No. 17/039,852.
Tzeng, Feng-Tzer, Notice of Allowance and Fee(s) Due mailed Feb. 3, 2022 for U.S. Appl. No. 17/039,852.
Tzeng, Feng-Tzer, Notice of Allowance and Fee(s) Due mailed Jul. 22, 2020 for U.S. Appl. No. 16/027,207.
U.S. Appl. No. 62/692,587, filed Jun. 29, 2018.
Vanek et al., Static Analysis of Program Source Code Using EDSA, Proceedings, Conference on Software Maintenance, 8 pages. (Year: 1989).
Vargas, Ariel Mercado, Notice of Allowance and Fee(s) Due mailed Aug. 20, 2021 for U.S. Appl. No. 16/696,782.
What is batch processing in hadoop, Quora webpages, May 29, 2016, https://www.quora.com/What-is-batch-pricessing-in-hadoop (Year: 2016).
Wood, Michael D., Notice of Allowance and Fee(s) Due mailed Oct. 22, 2021 for U.S. Appl. No. 16/432,086.
Rotaru, Octavian, Non-Final Office Action mailed Nov. 22, 2019 for U.S. Appl. No. 15/190,178.
Rotaru, Octavian, Notice of Allowance and Fee(s) Due mailed Dec. 21, 2020 for U.S. Appl. No. 15/190,178.
Schell, Joseph O., Corrected Notice of Allowability mailed Aug. 26, 2021 for U.S. Appl. No. 16/242,913.
Schell, Joseph O., Final Office Action mailed Mar. 25, 2021 for U.S. Appl. No. 16/242,913.
Schell, Joseph O., Notice of Allowance and Fee(s) Due mailed Aug. 6, 2021 for U.S. Appl. No. 16/242,913.
Tzeng, Feng-Tzer, Non-Final Office Action mailed Mar. 19, 2020 for U.S. Appl. No. 16/027,207.

* cited by examiner

SYSTEMS AND METHODS FOR CHRONOLOGICALLY AGNOSTIC INTEGRATION AND VISUALIZATION OF TEMPORAL DATABASE CHANGES

CROSS-REFERENCE TO RELATED APPLICATIONS

This application is a continuation application of copending U.S. patent application Ser. No. 16/532,669, filed Aug. 6, 2019 and titled, "HISTORY OF SLOWLY CHANGING DIMENSIONS," all of which is herein incorporated by reference in its entirety for all purposes.

FIELD

The disclosure relates to user building or rebuilding slowly changing dimension tables, and more particularly to constructing the slowly changing dimension tables via snapshots of a data source.

BACKGROUND

Slowly changing dimensions are data elements that change infrequently on a computational scale. Changes occur on a time scale that is perceivable by humans. For example, a value that changes in a database no more than several times a day is infrequent on a computational scale. Another example of computationally infrequent is consuming less than 1% of a processing core's cycles.

Users of a data source containing slowly changing dimensions often require visibility into the status of the value of those dimensions over time. Present methods are computationally inefficient.

BRIEF DESCRIPTION OF THE DRAWINGS

Various features and characteristics of the technology will become more apparent to those skilled in the art from a study of the Detailed Description in conjunction with the drawings. Embodiments of the technology are illustrated by way of example and not limitation in the drawings, in which like references may indicate similar elements.

FIG. 5 is a screenshot of a set of snapshots that inform the slowly changing dimension table.

DETAILED DESCRIPTION

Disclosed herein is a data structure that reduces computational load on a database in querying and visualizing historical values of slowly changing dimensions. A data source or a database includes a number of stored entities or objects. The objects have one or more values associated with them (e.g., a monthly average accounts receivable is a single value, and a set of contact information for an individual may have multiple values).

On a periodic basis, database images, also known as "snapshots" are generated of a current status of a given database. The snapshots enable reverting or recreating the last recorded state of the database. In some circumstances, users may want to review how the database has changed over time. In prior art systems, users had to query a set of snapshots and individually review those snapshots. Calling a number of snapshots requires a computational process that may be measured in whole seconds. On a contemporary computational device, calling approximately thirty database snapshots may take eight to ten seconds (the scaling "n" computational complexity of the query is the number of snapshots called). The query requires significantly more time for a human to read and comprehend the data presented.

Through generation of an additional data structure that stores historical changes in a slowly changing dimension, the computational processing time may be measured in milliseconds. For a similar query as described above, processing the call for the slowly changing dimension may take 300 milliseconds on a modern processing device. The "n" for which the computational query is based is the number of slowly changing dimensions called as opposed to a number of snapshots. The "n" of the data structure is a more slowly growing variable than the "n" of calling snapshots, and each called object is a smaller amount of data (a single element within a data structure as opposed to multiple copies of whole databases).

The data structure stores a history of values (e.g., slowly changing dimension was x during a first time range, y during a second time range, and z during a third time range) by processing a set of snapshots with respect to each slowly changing dimension. Processing of the snapshots is chronologically agnostic with respect to order. The history includes a timestamp range of each value held by the slowly changing dimension.

Figure 1:
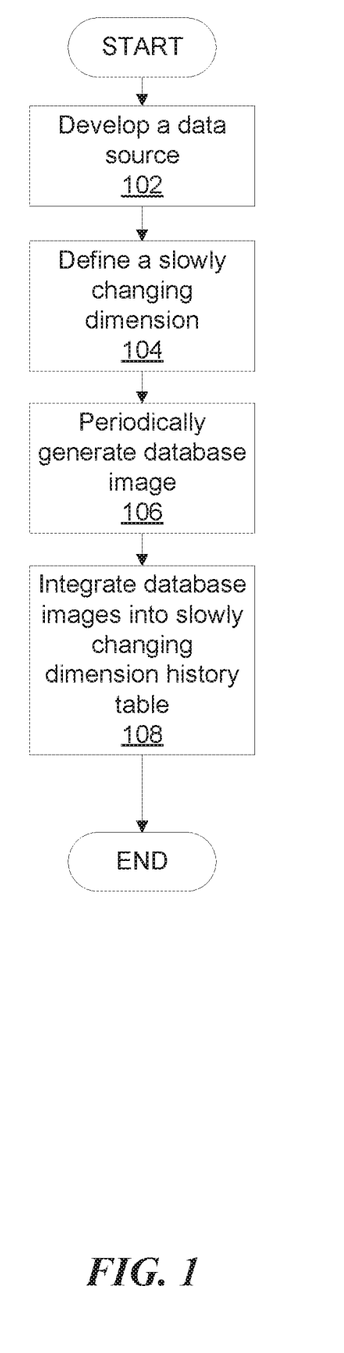
FIG. 1 is a flowchart illustrating a method of generating a data structure including a history of slowly changing dimensions.

FIG. 1 is a flowchart illustrating a method of generating a data structure including a history of slowly changing dimensions. In step 102, a system develops a data source or a database. The database includes a number of objects or entities that store values. Entities such as contact information, sales data, accounts receivable, personal statistics, values assigned to opportunities, etc. are all suitable examples.

In step 104, one or more of the entities is defined as a relevant slowly changing dimension. The slowly changing dimensions are data values that do not change frequently on a computational scale. For the purposes of this disclosure, a slowly changing dimension is a value that, on average, changes less frequently than the rate the system generates database snapshots of the database containing the value. While each of the entities provided as an example above is inherently a slowly changing dimension as a function of the frequency of updates, a "relevant" slowly changing dimension is determined either by the system automatically or by a user of the system. A relevant slowly changing dimension is one that is included in a history table of slowly changing dimensions.

The system may automatically define the relevancy of a slowly changing dimension by data types—that is, all objects/entities falling into certain classes may be automatically defined as relevant slowly changing dimensions. Users may define any object/entity with a store value as a relevant slowly changing dimension based on whim or other arbitrary criteria. A given slowly changing dimension may include multiple elements each storing a different value. For example, where the slowly changing dimension is contact information, one element may be a phone number, and another element may be an email address.

In step 106, the system periodically captures database images of the database storing the objects. These database snapshots may be generated prior to the definition of relevant slowly changing dimensions. Dimensions may be defined after the existence of database snapshots. Examples of the frequency include twice daily, daily, bi-weekly, and monthly. Database snapshots are typically used to revert the database to a previous snapshot, or to parse through changes. However, parsing through changes is typically performed using the database images themselves. Using the database images to parse through history is a cumbersome, human intensive process.

In step 108, the database snapshots are processed into a data structure that stores historical ranges for which a given slowly changing dimension held a particular value. The ranges are continuous through time and non-overlapping. Each element of each slowly changing dimension has a table that stores the timestamp range where the element held a particular value. A value that changes multiple times between periodic snapshots will not be captured by the table.

Figure 2:
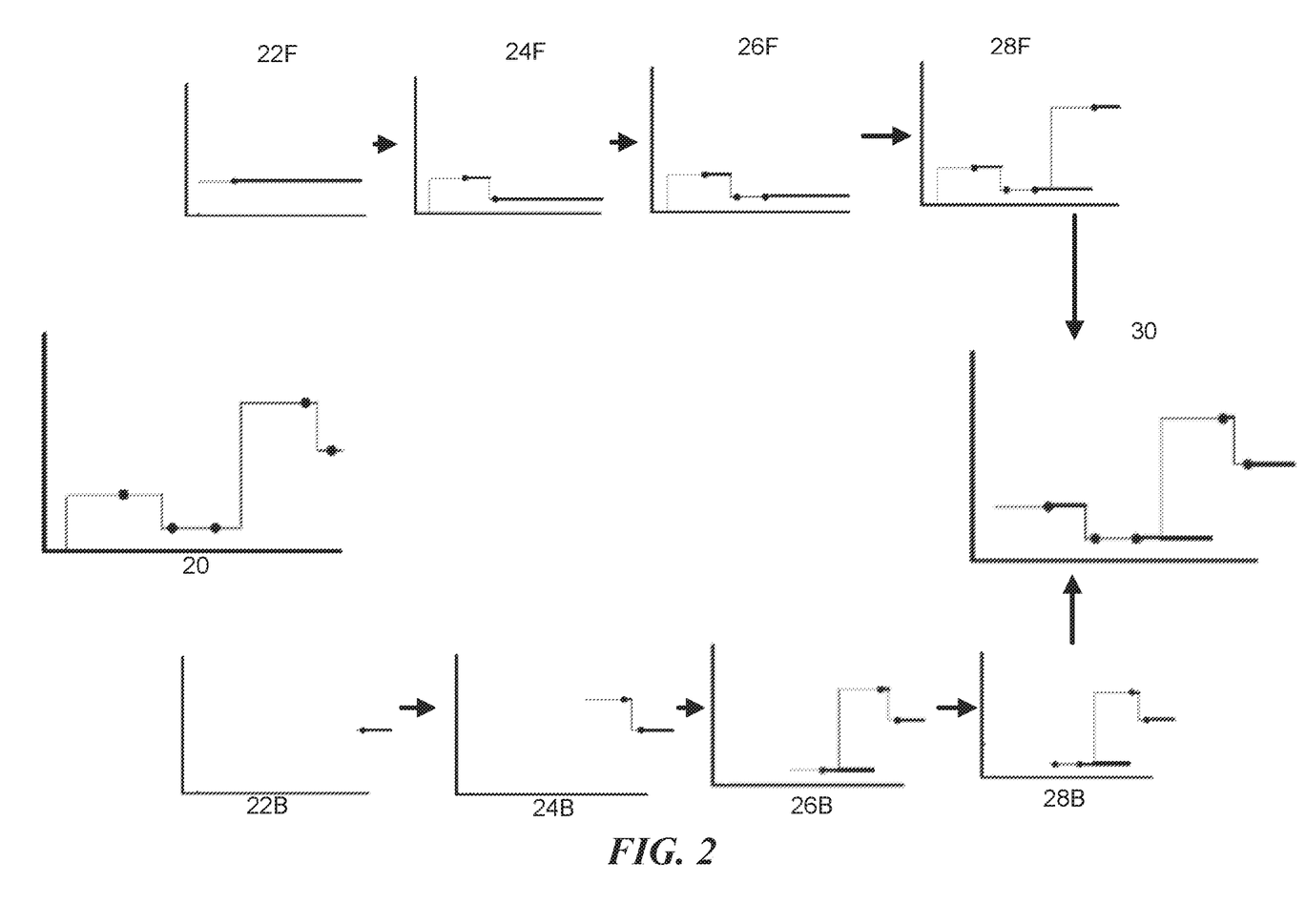
FIG. 2 is an illustration of a set of graphs depicting chronologically agnostic assembly of a data structure.

FIG. 2 is an illustration of a set of graphs depicting chronologically agnostic assembly of a data structure. Each of the graphs depicted represent the plot of some numerically sorted value (Y axis) as a function of time (X axis). The graph to the left side represents reality 20. The thin plotted line represents actual values held by a plotted slowly changing dimension. The bullet points represent the values of the slowly changing dimension as recorded in database snapshots.

The remaining set of graphs illustrate a progression of integration of database snapshots building (in graphs 22, 24, 26, and 28) from a first snapshot toward the last graph 30 including all available snapshots. The bolded horizontal lines following the snapshots represent the values held in the historical data table for slowly changing dimensions.

Notably, there are instances where the value in the historical data table for a given point in time differs from reality 20. The difference is a result of the granularity of periodically captured snapshots. If no snapshot was taken at a contemporaneous period with a change in value, the historical data table will not have the real value represented during that change.

The set of graphs proceeding along the top of the figure, "F," integrate snapshots progressing forward chronologically. The set of graphs proceeding along the bottom of the figure, "B," integrate snapshots in reverse order chronologically. Ultimately, integration of snapshots is order agnostic. Generation of the historical data table is order agnostic in order to improve taking advantage of parallel computing. In graph 22F the system integrates the first snapshot (chronologically). The bolded line continues off to the present because there are no integrated records that suggest otherwise. In 24F, the system integrates the second snapshot and the graph adjusts. The non-bolded line closely follows the historical data table (represented by the bold line) because the second snapshot was taken shortly after the change.

In 26F, the third snapshot does not change in value. In 28F, the fourth snapshot changes value. Notably, the non-bolded line diverges from the bolded lines. This is because the change to the database was made long before the next periodic snapshot was taken. However, because the values change slowly, the error is minimal, and no important data is unrepresented.

In some embodiments, rather than dating the change back to a most recent snapshot, the date of a SystemModStamp is used. A SystemModStamp is a timestamp for when a change to the database was made. In some databases the data includes a metadata value for when the change was made. Thus, the snapshots further include the time of the change and are thus more accurate than is pictured in FIG. 2.

In 30, the system has integrated all of the snapshots and the historical data table substantially reflects the real data. Across the bottom of the figure, the set of graphs depict the same integration of data in reverse.

Figure 3:
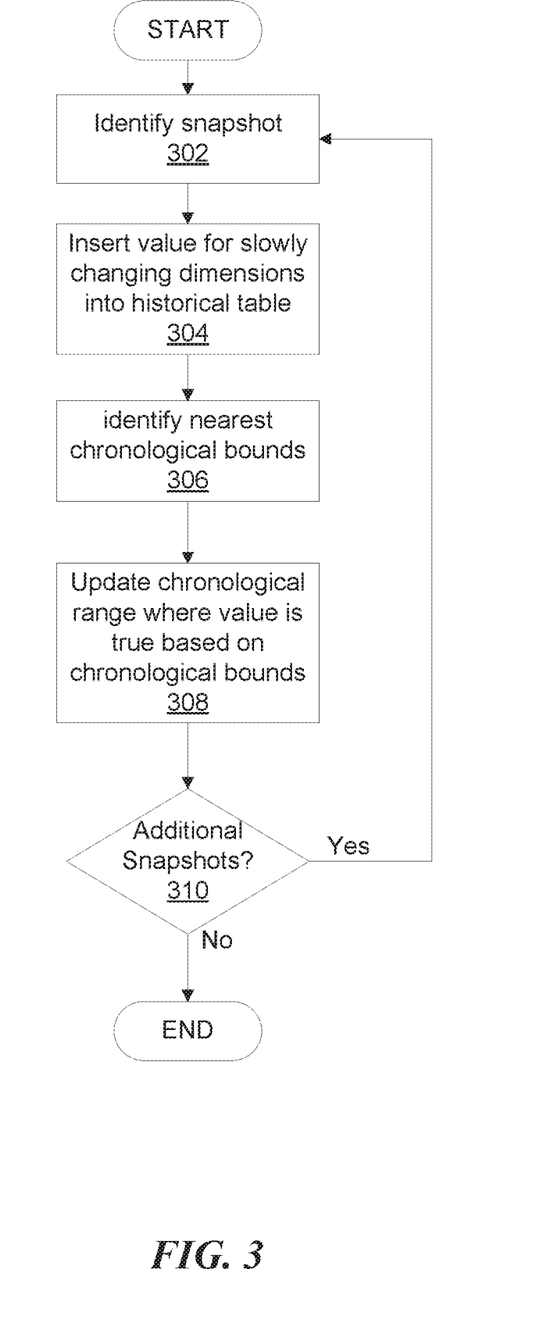
FIG. 3 is a flowchart illustrating a method of integrating snapshots into a slowly changing dimension table.

FIG. 3 is a flowchart illustrating a method of integrating snapshots into a slowly changing dimension table. In step 302, the system identifies a snapshot to integrate. When step 302 begins, there may be only a single snapshot to integrate because the system has been operating for some time and the historical data table is largely complete (aside from the most recent snapshot). Alternatively, there may be a lot of snapshots to work from. The system may newly introduce a relevant slowly changing dimension such that each of the snapshots is processed with respect to the new slowly changing dimension for the first time.

In step 304, the system inserts the value for the relevant slowly changing dimension as recorded in the snapshot to the timestamp of the snapshot (or alternatively the timestamp of the system modification). The value for the time previously held at the timestamp ends just prior to the timestamp, and the new value proceeds from the timestamp of the snapshot. In step 306, the system identifies the closest timestamps chronologically forward having an integrated snapshot. In some cases, there is no snapshot going forward through to the present, and then the newly integrated snapshot is the most recent.

In step 308, the system updates the chronological range of the value of the current snapshot from the respective timestamp of the snapshot up until the timestamp of the next snapshot proceeding chronologically forward. If there is no next timestamp, then the range proceeds until the present. In step 310, the system determines whether there exist additional snapshots to integrate. Where there are additional snapshots the method repeats from step 302.

The method of FIG. 3 may be operated in parallel. No step interferes with other steps. Two snapshots closer to each other than any other may be processed at near simultaneous times and the result when both complete will be the same. In some embodiments, the method depicted in FIG. 3 is performed prior to queries concerning slowly changing dimensions.

Figure 4:
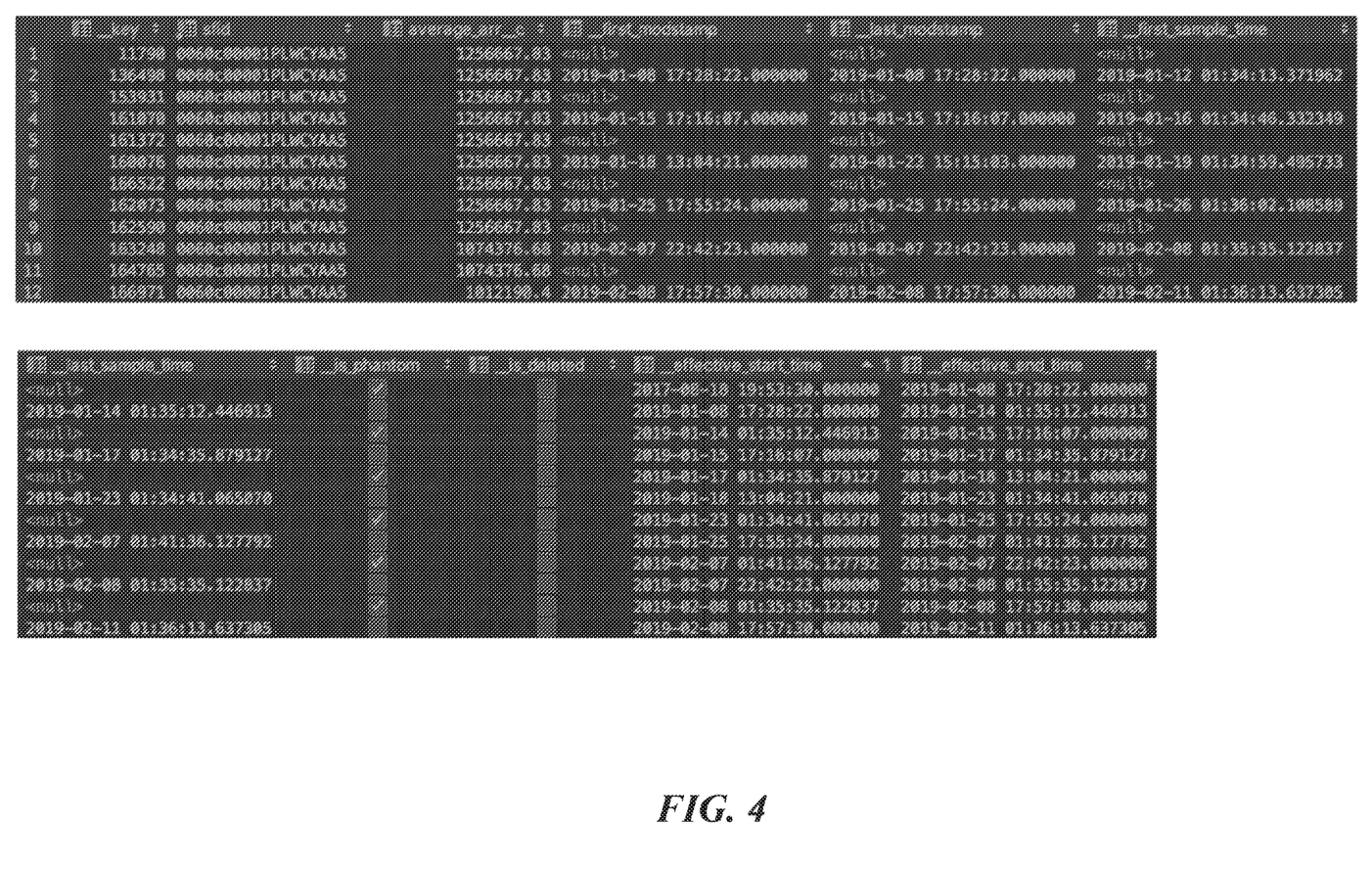
FIG. 4 is a screenshot of a screenshot of an example system output in response to a slowly changing dimension query.

FIG. 4 is a screenshot of an example system output in response to a slowly changing dimension query. Two sets of horizontal rows are pictured. The second aligns with the first. The output is directed to a slowly changing dimension for the average annual recurring revenue (AARR) amount for a single opportunity. As a point of nomenclature, each column prefixed with "\_\_\_\_\_\_" is used for the system to keep track of state. The columns entitled, "sfid," and "average_arr_c" refer to part of the slowly changing dimension queried. Specifically, "sfid" refers to an identifier for a given row/record of a snapshot. The average_arr_c column changes value over time and is the relevant slowly changing dimension.

The figure additionally includes two sets of first/last columns. Internally the system merges/compresses snapshots when the dimensional value has not changed between consecutive snapshots; however, in order to do the merge correctly while staying invariant to the order, the system keeps track of the earliest and latest snapshot values of the "systemmodstamp" and "sample_time." The systemmodstamp is the last time the entity was updated in the source system. The sample_time is the timestamp for the snapshot.

The column marked as "_key" is an internal unique id for the particular slowly changing dimension of the particular snapshot. The columns entitled "_first_modstamp" and "_last_modstamp" are the values from the earliest and latest (respectively) snapshot that the given row in the table represents for when the source record was last modified. Notably, over time many rows are merged. As depicted in the figure, the first nine rows hold the same value and will eventually be merged during processing. The columns "_first_sample_time" and "_last_sample_time" are the timestamps for the earliest and latest (respectively) snapshots that the given row represents.

The column, "_is_phantom" represents if the row is a phantom (e.g., a best estimate, or a guaranteed representation of the source system value). The column "_is_deleted" reflects whether the row or record was deleted in the source system at the time (e.g., did not hold a value). The column, "_effective_start_time," and "_effective_end_time" designates the period in time where the relevant slowing changing dimensional value was in effect.

FIG. 5 is a screenshot of a set of snapshots that inform the slowly changing dimension table. Each of the rows in FIG. 5 is a snapshot that is included in the historical dimension table depicted in FIG. 4. Prior to the existence of the historical dimension table of FIG. 4, a user would have to query all snapshots available and parse through each individually to obtain the same information.

Figure 6:
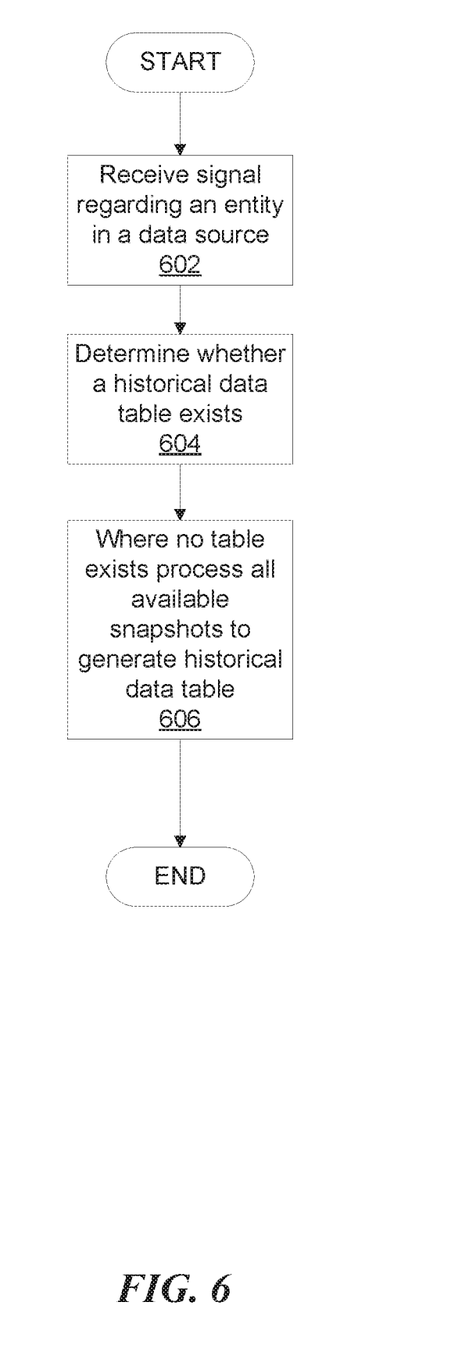
FIG. 6 is a flowchart illustrating the generation of slowly changing dimensions.

FIG. 6 is a flowchart illustrating the generation of slowly changing dimensions. In step 602, the system receives a signal regarding an entity within a database to classify it as a relevant slowly changing dimension. The signal may originate from an automated system definition or based on user input. In step 604, the system determines whether a table currently exists for the identified entity. When no such table exists, in step 606, the system processes each of the available snapshots up to the present.

Figure 7:
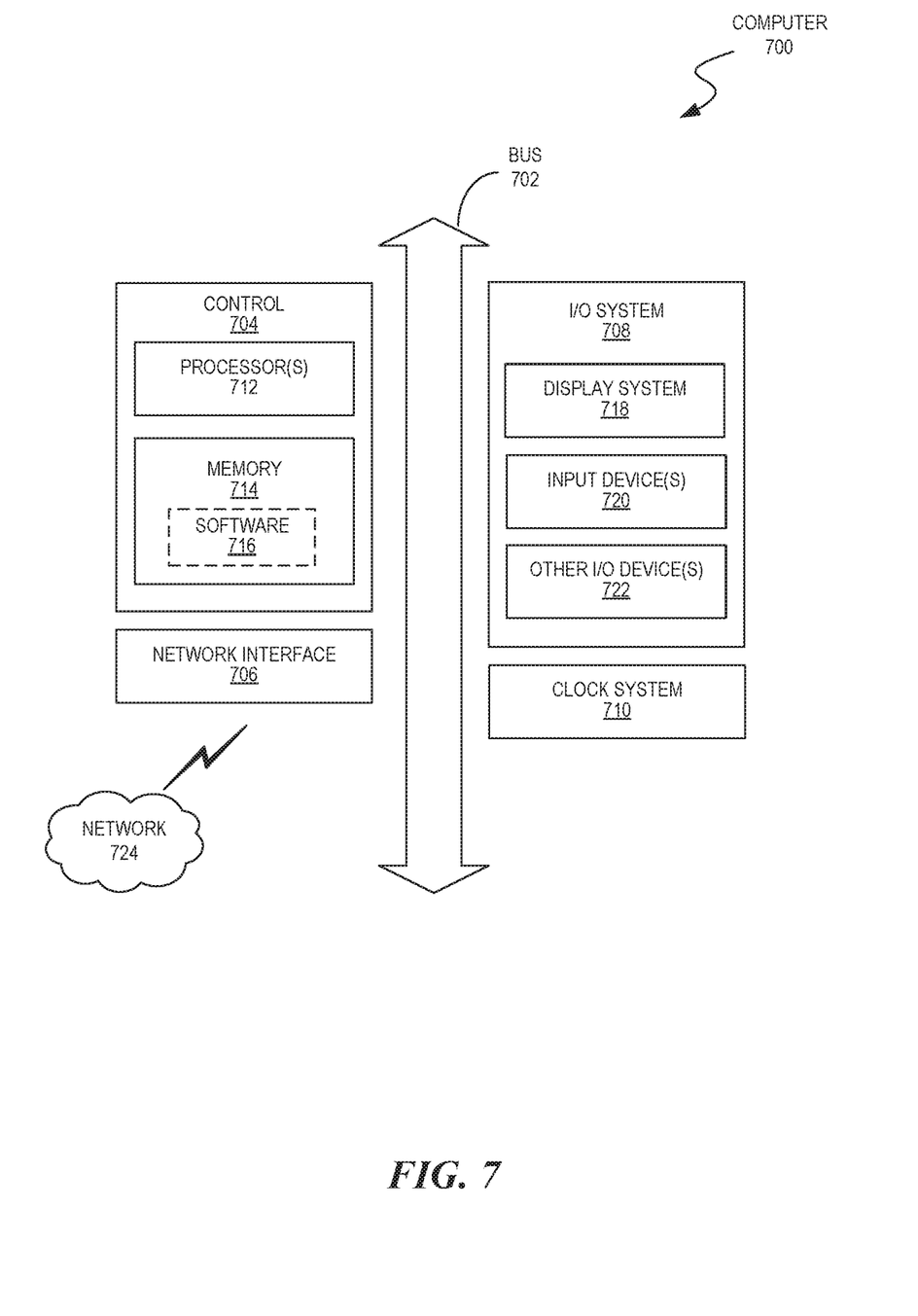
FIG. 7 is a block diagram of a computer operable to implement the disclosed technology according to some embodiments of the present disclosure.

FIG. 7 is a block diagram of a computer 700 operable to implement the disclosed technology according to some embodiments of the present disclosure. The computer 700 may be a generic computer or specifically designed to carry out features of the disclosed user input conversion system. For example, the computer 700 may be a system-on-chip (SOC), a single-board computer (SBC) system, a desktop or laptop computer, a kiosk, a mainframe, a mesh of computer systems, a handheld mobile device, or combinations thereof.

The computer 700 may be a standalone device or part of a distributed system that spans multiple networks, locations, machines, or combinations thereof. In some embodiments, the computer 700 operates as a server computer or a client device in a client-server network environment, or as a peer machine in a peer-to-peer system. In some embodiments, the computer 700 may perform one or more steps of the disclosed embodiments in real time, near real time, offline, by batch processing, or combinations thereof.

As shown in FIG. 7, the computer 700 includes a bus 702 that is operable to transfer data between hardware components. These components include a control 704 (e.g., processing system), a network interface 706, an input/output (I/O) system 708, and a clock system 710. The computer 700 may include other components that are not shown nor further discussed for the sake of brevity. One who has ordinary skill in the art will understand elements of hardware and software that are included but not shown in FIG. 7.

The control 704 includes one or more processors 712 (e.g., central processing units (CPUs)), application-specific integrated circuits (ASICs), and/or field-programmable gate arrays (FPGAs), and memory 714 (which may include software 716). For example, the memory 714 may include volatile memory, such as random-access memory (RAM), and/or non-volatile memory, such as read-only memory (ROM). The memory 714 can be local, remote, or distributed.

A software program (e.g., software 716), when referred to as "implemented in a computer-readable storage medium," includes computer-readable instructions stored in the memory (e.g., memory 714). A processor (e.g., processor 712) is "configured to execute a software program" when at least one value associated with the software program is stored in a register that is readable by the processor. In some embodiments, routines executed to implement the disclosed embodiments may be implemented as part of an operating system (OS) software (e.g., Microsoft Windows® and Linux®) or a specific software application, component, program, object, module, or sequence of instructions referred to as "computer programs."

As such, the computer programs typically comprise one or more instructions set at various times in various memory devices of a computer (e.g., computer 700), which, when read and executed by at least one processor (e.g., processor 712), will cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium (e.g., memory 714).

The network interface 706 may include a modem or other interfaces (not shown) for coupling the computer 700 to other computers over the network 724. The I/O system 708 may operate to control various I/O devices, including peripheral devices, such as a display system 718 (e.g., a monitor or touch-sensitive display) and one or more input devices 720 (e.g., a keyboard and/or pointing device). Other I/O devices 722 may include, for example, a disk drive, printer, scanner, or the like. Lastly, the clock system 710 controls a timer for use by the disclosed embodiments.

Operation of a memory device (e.g., memory 714), such as a change in state from a binary one (1) to a binary zero (0) (or vice versa) may comprise a visually perceptible physical change or transformation. The transformation may comprise a physical transformation of an article to a different state or thing. For example, a change in state may involve accumulation and storage of charge or a release of stored charge. Likewise, a change of state may comprise a physical change or transformation in magnetic orientation or a physical change or transformation in molecular structure, such as a change from crystalline to amorphous or vice versa.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A computer-implemented method of improving database visualization, comprising:
   periodically capturing, by a processor of a computing device, a set of database images of a database, the database having a number of objects or entities that store values;
   including a timestamp on each of the set of database images, the timestamp providing a time when a database image was captured by a system, the database image further showing a current status of the database;
   defining, by a user or automatically by the processor of the computing device, a slowly changing dimension in the database, the slowly changing dimension comprising a value that on average changes less frequently than a rate of said periodically capturing the set of database images of the database;
   integrating, by the processor, the set of database images into a data structure, the data structure storing a history of the slowly changing dimension including a range of time associated with each value held by the slowly changing dimension, the integrating being chronologically agnostic with respect to a timestamp order of integration of each of the set of database images, and each value is associated with a database image of the set of database images; and
   preparing, by the processor, a report based on the data structure that visually depicts in a display system the history of the slowly changing dimension.

2. A computer-implemented method of enhancing database data tracking, comprising:
   periodically capturing, by a processor of a computing device, a set of snapshots from a database, each snapshot including multiple fields of the database, the database having a number of objects or entities that store values;
   associating, by the processor, a unique timestamp with each of the snapshots, the unique timestamp providing a time when a database image was captured by a system, the database image further showing a current status of the database;
   detecting, by the processor, modifications in at least one of the multiple fields across multiple snapshots;
   storing a historical record of each modification in a data structure, the historical record being continuous and non-overlapping in time for each field;
   monitoring, by the processor, the data structure for anomalies in the set of snapshots, wherein anomalies include out-of-sequence timestamps, missing timestamps, or duplicate records;
   generating an alert if an anomaly is detected, the alert being transmitted to an external system or user interface for further investigation;
   providing an automated correction mechanism that adjusts the historical record to restore continuity in the data structure when an anomaly is corrected, wherein the automated correction mechanism adjusts time ranges stored for affected fields;
   updating the historical record in parallel with both forward and reverse chronological entries; and
   presenting, by the processor, a graphical interface that depicts historical changes in the at least one of the multiple fields over a period of time.

3. The computer-implemented method of claim 2, wherein the set of snapshots is generated based on predefined intervals.

4. The computer-implemented method of claim 2, wherein the modifications include changes in numeric values stored in the database fields.

5. The computer-implemented method of claim 2, further comprising tracking the modifications within the historical record to identify inconsistencies between snapshots.

6. The computer-implemented method of claim 2, wherein the data structure is updated asynchronously as new snapshots are captured.

7. The computer-implemented method of claim 2, wherein the graphical interface allows users to visualize changes in the at least one field as a function of time.

8. The computer-implemented method of claim 2, wherein the set of snapshots includes metadata describing additional characteristics of the fields.

9. The computer-implemented method of claim 2, further comprising generating a report based on the historical record.

10. A computer-implemented method of managing historical records in a database, comprising:
    periodically capturing, by a processor of a computing device, a set of time-stamped data inputs from a database, each input representing a snapshot of a set of fields from the database at a specific point in time, the database having a number of objects or entities that store values;
    consolidating, by the processor, the set of time-stamped data inputs into a unified data structure, the unified data structure being configured to store the historical records of each field, wherein the historical records are stored as non-overlapping time ranges for each value held by the set of fields, the consolidating being chronologically agnostic with respect to a timestamp order of consolidation of each of the time-stamped data inputs;
    detecting discrepancies in the field values across the set of time-stamped data inputs, wherein the discrepancies are identified by comparing the values of at least one field between consecutive time-stamped data inputs;

updating, by the processor, the unified data structure by adjusting the stored historical records to account for the identified discrepancies, wherein the historical records are modified based on a priority rule that resolves the discrepancies by assigning priority to a most recent time-stamped data input, the updating further comprising:

merging data inputs from different database sources, wherein merging involves comparing overlapping time ranges for a same field from multiple sources;

applying source reliability rules during the merging process to prioritize data inputs from a more reliable or trusted source over less reliable sources; and creating a conflict resolution log that records each instance of conflict between data sources, the conflict resolution log detailing the source of the conflict, resolution applied, and a reason for prioritizing one data input over another;

storing the updated historical records in the unified data structure as continuous, non-overlapping time ranges for each field, such that each field's historical record reflects a temporally accurate sequence of values; and generating, by the processor, a visual representation of the historical records, wherein the visual representation displays changes in the at least one field over time as a function of the non-overlapping time ranges stored in the unified data structure.

11. The computer-implemented method of claim 10, wherein the set of time-stamped data inputs are processed based on a common system time stored with each input.

12. The computer-implemented method of claim 10, wherein the discrepancies are resolved by assigning priority to more recent time-stamped data inputs.

13. The computer-implemented method of claim 10, further comprising generating a report that details the identified discrepancies between time-stamped inputs.

14. The computer-implemented method of claim 10, wherein the time-stamped data inputs include both numeric and textual data types.

15. The computer-implemented method of claim 10, further comprising applying a comparison between time-stamped data inputs to detect inconsistencies in the stored data.

16. The computer-implemented method of claim 10, wherein the set of time-stamped data inputs are generated from the database that periodically stores snapshots.

17. The computer-implemented method of claim 10, wherein the unified data structure is updated periodically based on the latest time-stamped data inputs.

18. The computer-implemented method of claim 10, wherein consolidating the set of time-stamped data inputs into the unified data structure further comprises:

indexing each time-stamped data input by both its timestamp and the field it represents, such that each data input can be quickly accessed or queried by either the timestamp or the field value;

assigning unique identifiers to each time-stamped data input to maintain traceability of every data modification throughout the history of the unified data structure; and compressing the stored time-stamped data inputs in the unified data structure by eliminating redundant data entries for fields that have not changed between consecutive time-stamped snapshots, thereby reducing storage space and improving retrieval efficiency.

19. The computer-implemented method of claim 10, further comprising:

monitoring the unified data structure for anomalies in the set of time-stamped data inputs, wherein anomalies include out-of-sequence timestamps, missing timestamps, or duplicate records;

generating an alert if an anomaly is detected, the alert being transmitted to an external system or user interface for further investigation; and providing an automated correction mechanism that adjusts the historical record to restore continuity in the unified data structure when an anomaly is corrected, wherein the automated correction mechanism adjusts the time ranges stored for affected fields.

20. The computer-implemented method of claim 10, wherein the visual representation generated further comprises:

allowing a user to apply customized filters to the historical records displayed, wherein the customized filters can be set by time range, specific fields, or specific data values;

providing a dynamic timeline interface that visually highlights periods of high data modification activity and periods of stability for each field, using color-coded markers or other graphical cues; and enabling a comparison mode that allows users to simultaneously view historical changes of two or more fields over a specified time range, displaying side-by-side graphs or overlays to facilitate comparative analysis.

* * * * *

UNITED STATES PATENT AND TRADEMARK OFFICE
CERTIFICATE OF CORRECTION

| | | |
|---|---|---|
| PATENT NO. | : 12,399,877 B2 | Page 1 of 1 |
| APPLICATION NO. | : 17/953226 | |
| DATED | : August 26, 2025 | |
| INVENTOR(S) | : Simon Ejsing and Andrew Chico | |

It is certified that error appears in the above-identified patent and that said Letters Patent is hereby corrected as shown below:

On the Title Page

Item (71) the Applicant's address should be listed as "Austin, Texas (US)".

Signed and Sealed this
Tenth Day of February, 2026

John A. Squires
*Director of the United States Patent and Trademark Office*